United States Patent [19]
Shinozaki et al.

[11] Patent Number: 4,956,034
[45] Date of Patent: Sep. 11, 1990

[54] METHOD AND APPARATUS FOR MANUFACTURING LAMINATED GLASS

[75] Inventors: Kazushi Shinozaki; Shingo Seki, both of Osaka, Japan

[73] Assignee: Nippon Sheet Glass Co., Ltd., Osaka, Japan

[21] Appl. No.: 278,951

[22] Filed: Nov. 30, 1988

[30] Foreign Application Priority Data

| Nov. 30, 1987 | [JP] | Japan | 62-303033 |
| Nov. 30, 1987 | [JP] | Japan | 62-182422[U] |
| Jul. 8, 1988 | [JP] | Japan | 63-170097 |
| Jul. 8, 1988 | [JP] | Japan | 63-170096 |

[51] Int. Cl.⁵ .......................................... B32B 31/12
[52] U.S. Cl. .................... 156/102; 156/73.3; 156/106; 156/160; 156/196; 156/256; 156/306.6; 156/321; 156/475; 156/510
[58] Field of Search ........... 156/64, 99, 102, 106, 156/196, 256, 306.6, 321, 475, 510, 165, 73.3

[56] References Cited
U.S. PATENT DOCUMENTS

4,367,106  1/1983  Valimont ................ 156/102
4,793,878  12/1988  Guglielmetti et al. ......... 156/102 X

FOREIGN PATENT DOCUMENTS

| 58-26053 | 2/1983 | Japan . |
| 59-3052 | 1/1984 | Japan . |
| 60-180942 | 9/1985 | Japan . |
| 61-297009 | 12/1986 | Japan . |
| 62-202843 | 9/1987 | Japan . |

*Primary Examiner*—Robert A. Dawson
*Attorney, Agent, or Firm*—Lowe, Price, LeBlanc, Becker & Shur

[57] ABSTRACT

Intermediate films are automatically removed from an intermediate film stack. The removed intermediate film is positioned on a table and cut to a desired size, and then placed on one of two curved glass sheets which has its convex side facing up. Thereafter, the other glass sheet is positioned over said one of the glass sheets, and both the glass sheets are positioned at the same time. Then, the lower glass sheet is moved upwardly against the upper glass sheet so that the glass sheets are superposed with the intermediate film interposed therebetween.

21 Claims, 18 Drawing Sheets

FIG. 4
FIG. 5
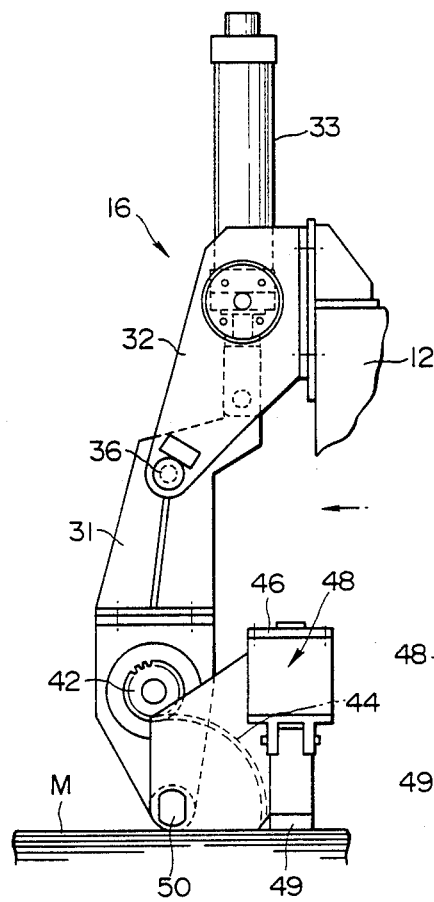
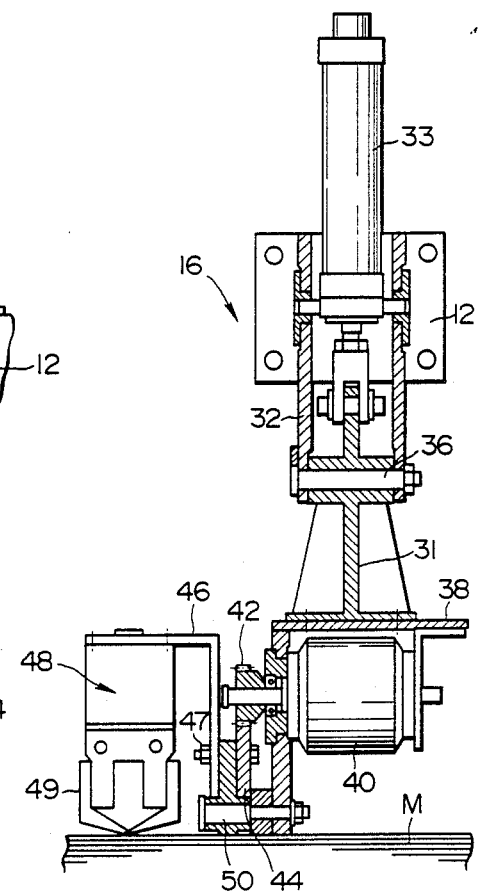

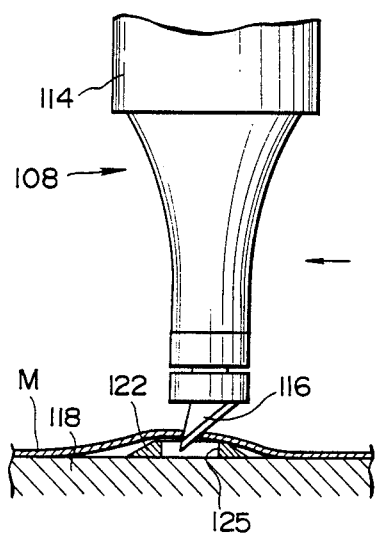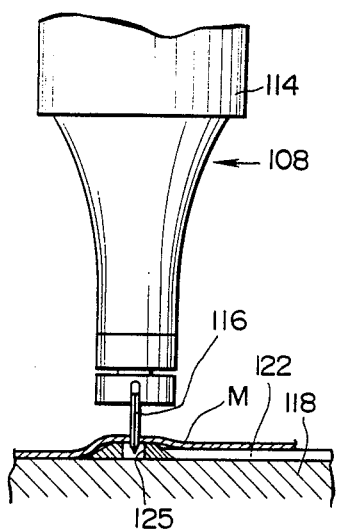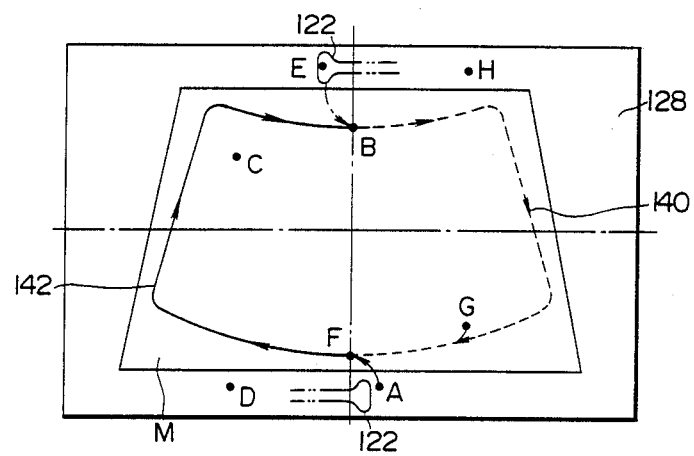

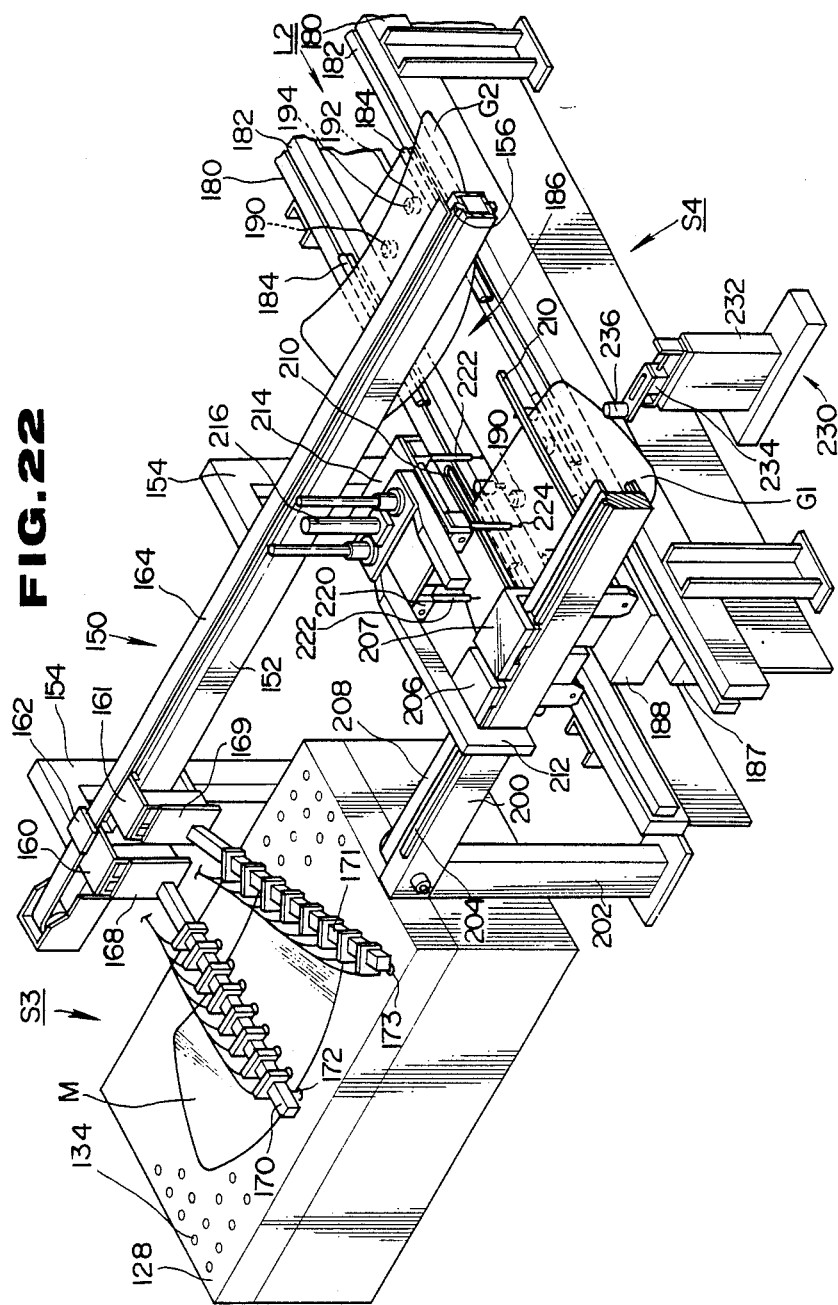

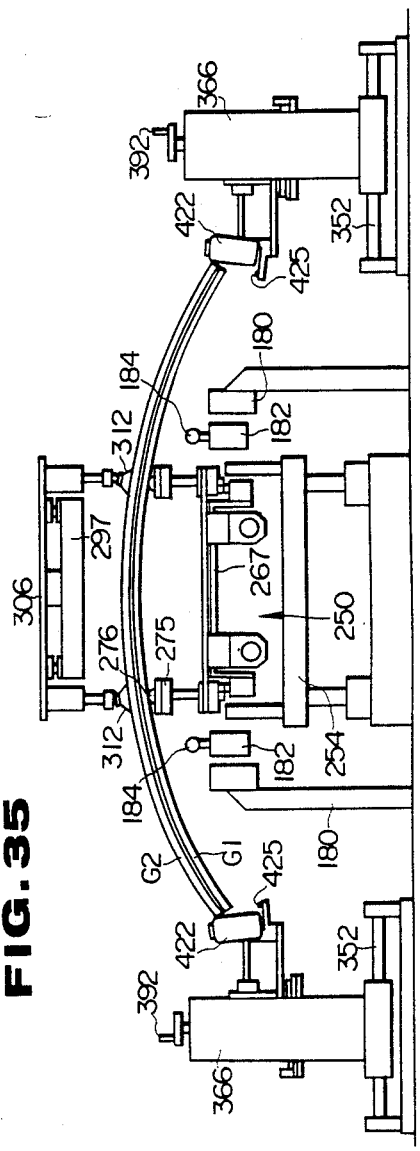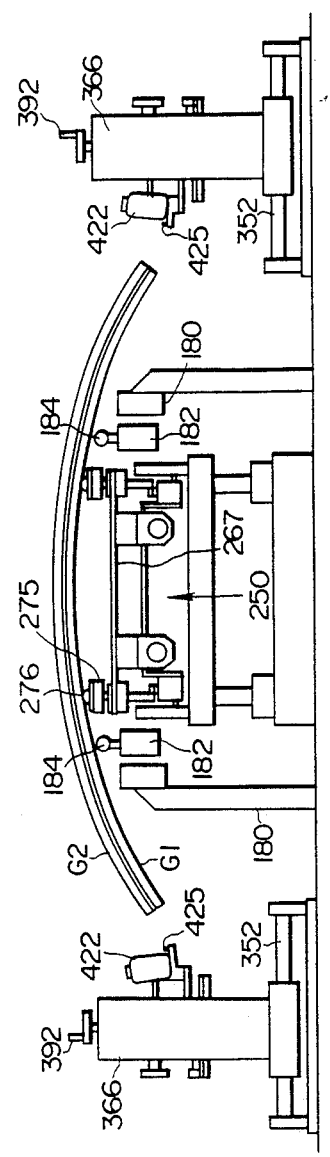

METHOD AND APPARATUS FOR MANUFACTURING LAMINATED GLASS

BACKGROUND OF THE INVENTION

1. Field of the Invention:

The present invention relates to a method of and an apparatus for manufacturing a laminated glass.

2. Description of the Relevant Art:

Laminated glasses are widely used in various fields, one example being an automobile windshield. One most general laminated glass available now comprises two glass sheets bonded together with an intervening layer of a thermoplastic material such as polyvinyl butyral inserted therebetween.

Such a laminated glass is manufactured by an apparatus as disclosed in Japanese Laid-Open Patent Publication No. 58-26053, for example. Two curved glass sheets which are heated to a relatively high temperature are fed together into the apparatus by a conveyor with their concave sides facing up. In the apparatus, the glass sheets are first positioned, and then the upper glass sheet is lifted. A holder mold with an intermediate film held under suction is inserted between the upper and lower glass sheets, and the intermediate film is placed on the upper surface of the lower glass sheet, whereupon the intermediate film adheres to the lower glass sheet due to the heat of the lower glass sheet. Therefore, the intermediate film has to be placed in position on the lower glass sheet before the lower glass sheet is cooled. The intermediate film positioned on the concave side of the curved lower glass sheet often tends to develop wrinkles.

Japanese Laid-Open Patent Publication No. 62-202843 shows another apparatus for manufacturing a laminated glass. According to this apparatus, two glass sheets are separately fed by a conveyor, and then positioned in respective separate locations. Then, an intermediate film is put on one of the glass sheets, and the other glass sheet is placed on the intermediate film. Consequently, the two glass sheets are first positioned, and thereafter the intermediate film is placed on one of the glass sheets, after which the other glass sheet is brought over the intermediate film. When these other manufacturing steps are carried out after the two glass sheets have been positioned, however, the glass sheets are apt to be misaligned with respect to each other.

An intermediate film for a laminated glass is required to be finally equalized in dimensions and shape to glass sheets between which it is sandwiched. Devices for cutting off the intermediate film to desired dimensions and shape are disclosed in Japanese Laid-Open Patent Publications Nos. 59-3052 and 61-297009, for example. In the disclosed devices, after an intermediate film has been sandwiched between two glass sheets, the marginal portion of the intermediate film which protrudes out of the glass sheets is cut off by a cutter. If the cutter hits an edge of the glass sheet, then the edge of the glass sheet may be broken or the cutter itself may be damaged. Another cutting process, which is disclosed in Japanese Laid-Open Patent Publication No. 60-180942, employs a water jet for cutting off an intermediate film only. While the water jet does not damage the glass sheets which sandwich the intermediate film therebetween, a water draining system required by the use of the water jet makes the overall apparatus complex and large in size.

SUMMARY OF THE INVENTION

It is an object of the present invention to provide a method of and an apparatus for manufacturing a laminated glass highly efficiently by placing an intermediate layer between two glass sheets without developing wrinkles on the intermediate layer.

According to the present invention, there is provided a method of manufacturing a laminated glass, comprising the steps of: automatically removing intermediate films, one at a time, from an intermediate film stack successively from the uppermost intermediate film on the intermediate film stack; positioning the removed intermediate film; cutting the positioned intermediate film to a prescribed shape; positioning one of two curved glass sheets which has a convex side facing up; transferring the intermediate film over the convex side of the positioned one of the curved glass sheets; and simultaneously positioning said one glass sheet over which the intermediate film has been transferred and the other glass sheet, and superposing the glass sheets one on the other with the intermediate film interposed therebetween.

According to the present invention, there is also provided an apparatus for manufacturing a laminated glass, comprising: peeling means for automatically removing intermediate films, one at a time, from an intermediate film stack successively from the uppermost intermediate film on the intermediate film stack; first positioning means for positioning the removed intermediate film; cutting means for cutting the positioned intermediate film to a prescribed shape; conveyor means for conveying two curved glass sheets; second positioning means for positioning the two curved glass sheets, respectively, which have been conveyed thereto; transfer means for transferring the intermediate film over the convex side of a positioned one of the curved glass sheets; and superposing means for simultaneously positioning said one glass sheet over which the intermediate film has been transferred and the other glass sheet, and for superposing the glass sheets one on the other with the intermediate film interposed therebetween.

Since the intermediate film is placed on one of the glass sheets which has its convex side facing up, the intermediate film is less liable to develop wrinkles. Any wrinkles which may be formed on the intermediate film are stretched out by two rods which are moved outwardly from the central portion of the film. Therefore, the intermediate film which is completely free from any wrinkles can be placed on the glass sheet. Since the intermediate film is pressed down against the glass sheet by presser pads, other processing steps can be carried out on the intermediate film and the glass sheets after the glass sheets have been cooled, without the danger of being displaced with respect to the cooled glass sheets.

Before the two glass sheets are superposed one on the other, they are simultaneously positioned by a positioning device so that they will not be misaligned.

The intermediate film is cut to shape before it is inserted between the two glass sheets. A cutting head assembly includes a cutter blade which is connected to an ultrasonic transducer so as to be ultrasonically vibrated vertically to cut the intermediate film rapidly to desired dimensions. The cutting head assembly also includes a coacting arm for coacting with the cutter blade. The coacting arm has a slanted side on its distal end, which is inserted between a suction table and the intermediate film to keep the intermediate film lifted off the table while the intermediate film is being cut by the cutter blade. The coacting arm has a through hole defined in the distal end thereof for receiving a portion of the cutter blade.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is an elevational view of the film lifting unit of FIG. 3;

FIG. 5 is a cross-sectional view of the film lifting unit as viewed in the direction of the arrow in FIG. 4;

FIG. 19 is an enlarged elevational view of a tip portion of the cutting head assembly of FIG. 18;

FIG. 20 is a view of the cutting head assembly as viewed in the direction of the arrow in FIG. 19;

FIG. 21 is a schematic plan view showing the manner in which an intermediate film is cut off;

FIG. 22 is an enlarged perspective view of the cutting station, a film placing station, and a feed mechanism illustrated in FIG. 1;

FIGS. 33 through 36 are elevational views illustrating a process of superposing two glass sheets one upon the other.

DESCRIPTION OF THE PREFERRED EMBODIMENTS

Figure 1:
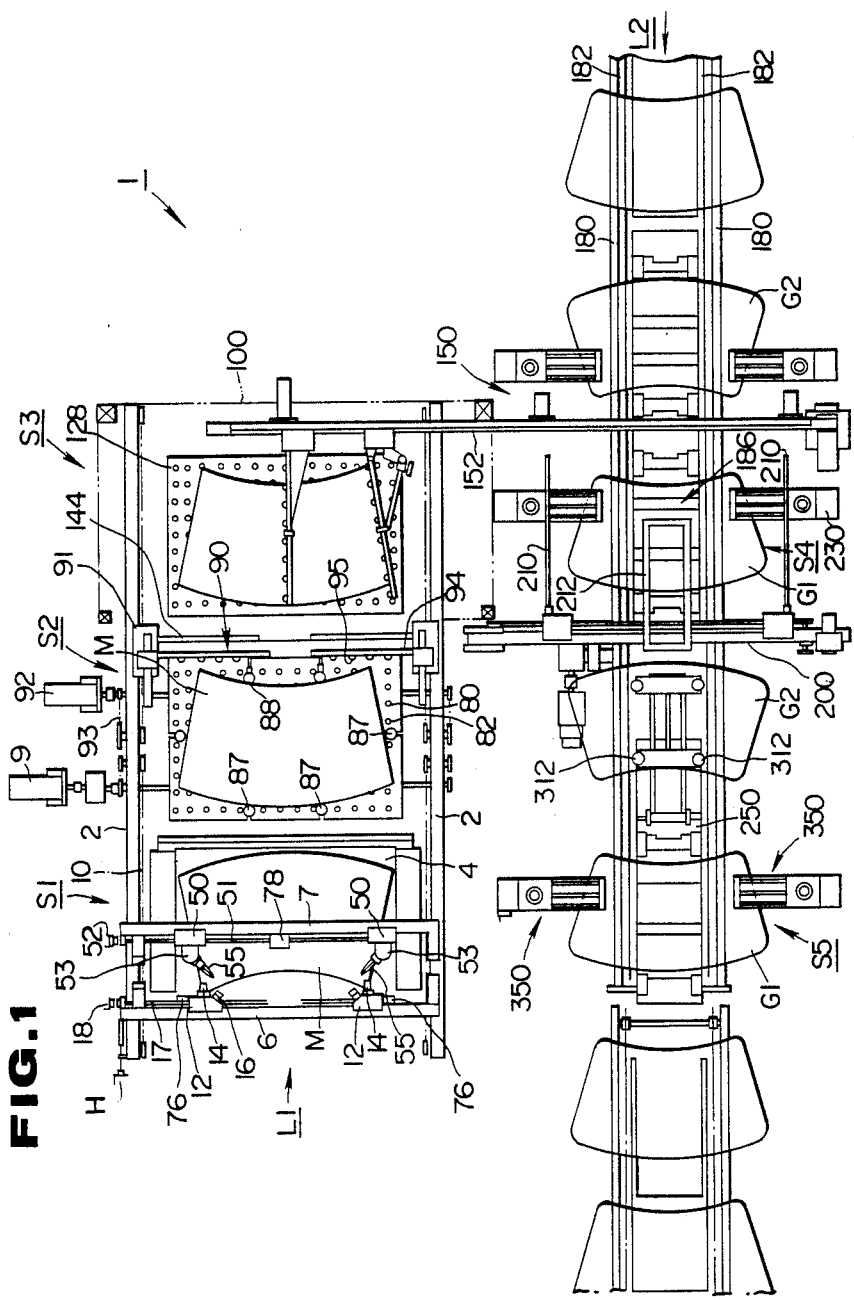
FIG. 1 is a plan view of an apparatus for manufacturing a laminated glass according to the present invention, with a cutting head assembly and some structural members being omitted from illustration for brevity.

An apparatus, generally designated by the reference numeral 1 in FIG. 1, for manufacturing a laminated glass includes a first conveyor line L1 for feeding an intermediate film M and a second conveyor line L2 parallel to the first conveyor line 11 for feeding two curved glass sheets G1, G2 between which the intermediate sheet M is to be interposed. In FIG. 1, the intermediate film M is fed from the left to the right by the first conveyor line L1, and the glass sheets G1, G2 are fed from the right to the left by the second conveyor line L2.

Figure 2:
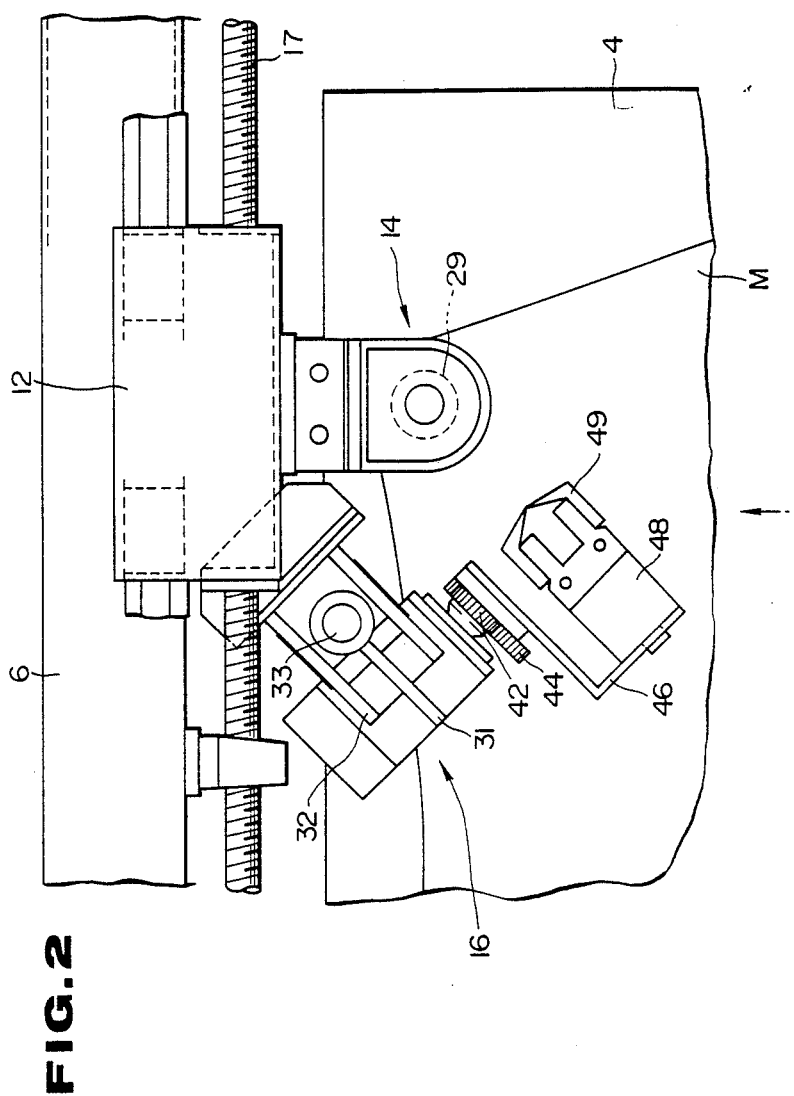
FIG. 2 is an enlarged plan view of a film peeling unit and a film lifting unit shown in FIG. 1.

The first conveyor line L1 has two fixed parallel rails 2 extending longitudinally with respect to the line L1 and a peeling station S1 in its most upstream end for peeling one at a time of stacked intermediate films M. The peeling station S1 has a pallet 4 disposed between the fixed rails 2 and supporting thereon a stack of about hundred intermediate films M of polyvinyl butyral which are cut to a size that is 10 to 50 mm larger than the size of the glass sheets. Two movable rods 6, 7 are disposed on and extend perpendicularly between the fixed rails 2. The movable rod 6 runs on the rails 2 by turning a handle H, and the other movable rod 7 runs on the rails 2 by energizing a motor 9 which is operatively connected to the movable rod 7 through a timing belt 10. The movable rods 6, 7 are thus moved to meet all sizes of various intermediate films M to be handled. Two film peeling units 14 and two film lifting units 16, each shown in detail in FIG. 2, are mounted on the movable rod 6 by means of supports 12 attached to the movable rod 6. The supports 12 are threaded over a ball screw 17 so that they can be moved along the movable rod 6 by rotating the ball screw 17 about its own axis with a handle 18 (FIG. 1) attached to one end of the ball screw 17.

Figure 3:
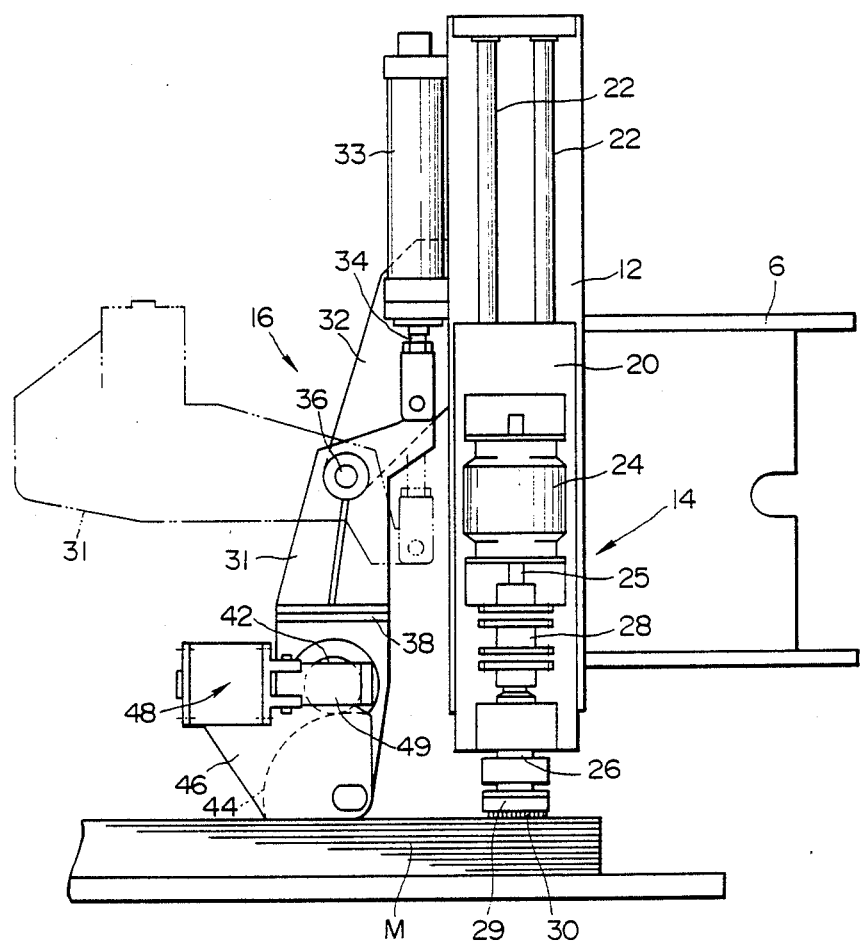
FIG. 3 is an elevational view of the film peeling unit and the film lifting unit shown in FIG. 2.

As shown in FIG. 3, each of the film peeling units 14 comprises a vertically movable body 20 which is vertically movable along two upstanding guide rods 22 mounted on the support 12 by means of a pneumatic cylinder (not shown), and a rotary actuator 24 fixed to the vertically movable body 20. The rotary actuator 24 has an output shaft 25 to which a rotatable shaft 26 is coupled through a suitable coupling 28. A disc-shaped film peeling head 29 is attached to the lower free end of the rotatable shaft 26. According to one embodiment, the film peeling head 30 has a multiplicity of downwardly extending needles 30 on its lower surface.

As illustrated in FIGS. 3 through 5, each of the film lifting units 16 has a swing arm 31 swingably mounted on a bracket 32 attached to a side of the support 12, and a pneumatic cylinder 33 fixedly mounted on the support 12. The pneumatic cylinder 33 has a piston rod 34 coupled to one end of the swing arm 31. When the pneumatic cylinder 33 is operated as shown in FIG. 3, the swing arm 31 is angularly moved about a pin 36 between a vertical position indicated by the solid lines and a horizontal position indicated by the broken lines. A rotary actuator 40 is attached through a bracket to an attachment plate 38 fixed to the other end of the swing arm 31. The rotary actuator 40 has an output shaft to which there is fixed a pinion 42 held in mesh with a sector gear 44. An attachment plate 46 is fastened to the sector gear 44 by means of a bolt 47, and a film peeling head 48 having a pair of fingers 49 is mounted on the attachment plate 46. By actuating the rotary actuator 40, the film lifting head 48 can be moved about a pin 50 between a horizontal position shown in FIG. 3 and a vertical position shown in FIG. 4.

Referring back to FIG. 1, two supports 50 are also mounted on the other movable rod 7, and a ball screw 51 threadedly extends through the supports 50. The supports 50 are movable along the movable rod 7 by turning a handle 52 attached to one end of the ball screw 51. Transfer units 53 are mounted respectively on the supports 50 and have respective turning hands 55 which can be turned in a horizontal plane by suitable drive sources (not shown).

Figure 6:
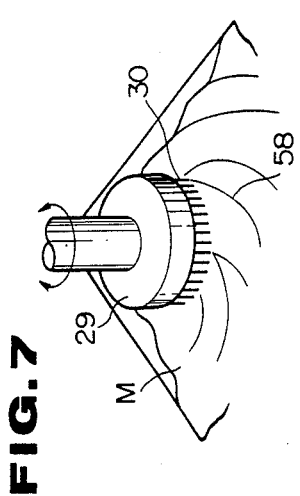
FIG. 6 is a perspective view of a film peeling head.
Figure 7:
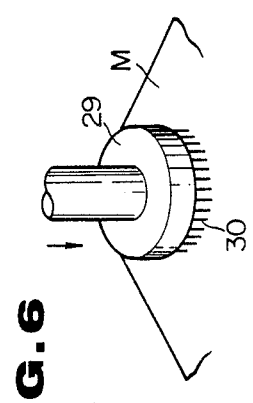
FIG. 7 is a view similar to FIG. 6, showing the manner in which the film peeling head is rotated to form wrinkles on an intermediate film.
Figure 8:
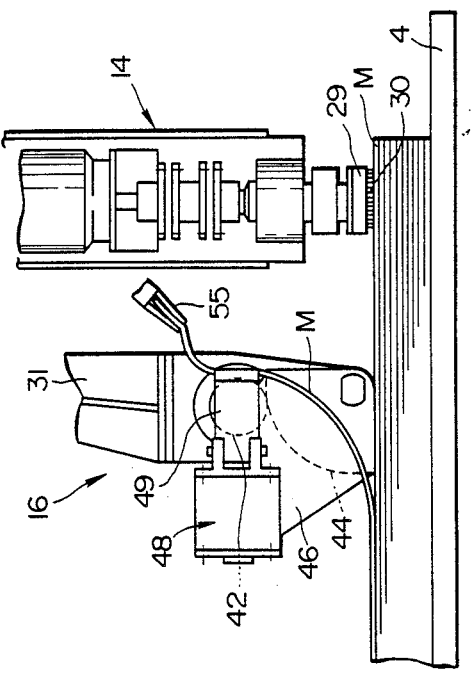
FIG. 8 is an elevational view showing the manner in which a film lifting head and the film peeling head coact with each other to peel an intermediate film.
Figure 9:
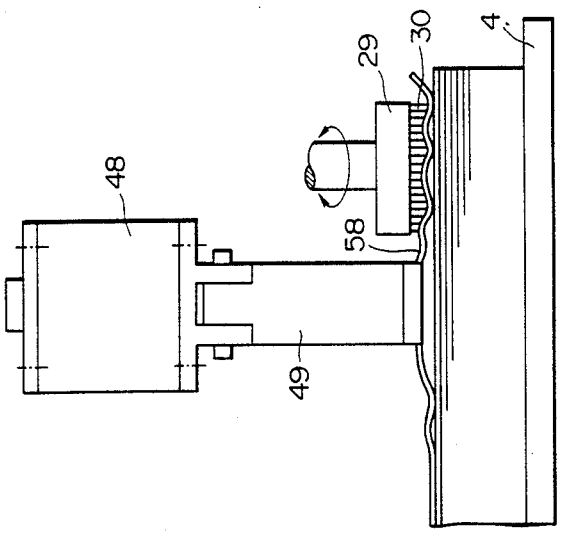
FIG. 9 is an elevational view showing the manner in which the peeled intermediate film is gripped by a turning hand.
Figure 10A:
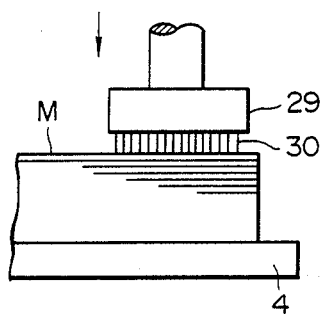
FIGS. 10A and 10B are elevational views showing the manner in which the film peeling head is laterally slid to develop wrinkles on an intermediate film.
Figure 10B:
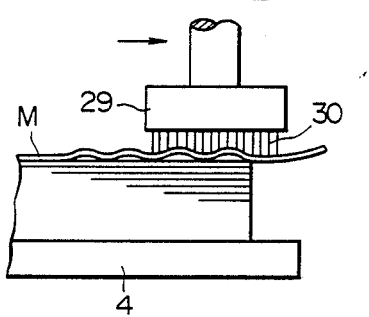

The peeling station S1 operates as follows: The vertical movable body 20 (FIG. 3) is lowered until the needles 30 on the lower end of the peeling head 29 abut against one corner of the uppermost intermediate film M as shown in FIG. 6. The pneumatic pressure supplied to a pneumatic cylinder (not shown) to actuate the vertical movable body 20 is regulated such that the peeling head 29 is lowered to the extent that the needles 30 penetrate only the uppermost intermediate film M, but leave the intermediate film M beneath the uppermost film M. When the needles 30 penetrate only the uppermost film M, the rotary actuator 24 is driven to rotate the peeling head 29 alternately clockwise and counterclockwise as shown in FIG. 7 through relatively small angles to develop wrinkles on the film M. At the same time, the pneumatic cylinder 33 is operated to swing the swing arm 31 from the horizontal position indicated by the broken lines in FIG. 3 to the vertical position indicated by the solid lines in FIG. 3. Then, the rotary actuator 40 is operated to turn the film lifting head 48 from the horizontal position (FIG. 3) to the vertical position FIGS. 4 and 5) to cause the fingers 49 to grip a wrinkled portion 58 of the film M, as shown in FIG. 8. The peeling head 29 is lifted to move the needles 30 out of engagement with the film M, and the film lifting head 48 is returned to the horizontal position. Thereafter, the peeling head 29 is lowered to cause the needles 30 to penetrate the next intermediate film M. Simultaneously, the turning hands 55 of the transfer units 53 are moved to grip an upper edge of the film M which is gripped by the fingers 49. The fingers 49 are then opened to release the film M, and the swing arm 31 is moved from the vertical position back to the horizontal position (indicated by the broken lines in FIG. 3). When all the above operation is completed, the movable rod 7 is moved to a next positioning station S2. While the movable rod 7 is being thus moved, the turning hands 55 are horizontally turned from the position of FIG. 1 outwardly to spread the intermediate film M. Since the turning hands 55 grip the upstream end of the intermediate film M, the intermediate film M will have been reversed or turned over when it is moved to the positioning station S2. The intermediate film M may be wrinkled by moving the peeling head 29 laterally from the position shown in FIG. 10A to the position of FIG. 10B.

Figure 11A:
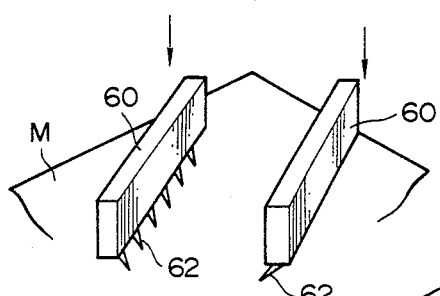
FIGS. 11A and 11B are perspective views showing the manner in which wrinkles are formed on an intermediate film by a film peeling head according to another embodiment of the present invention.
Figure 11B:
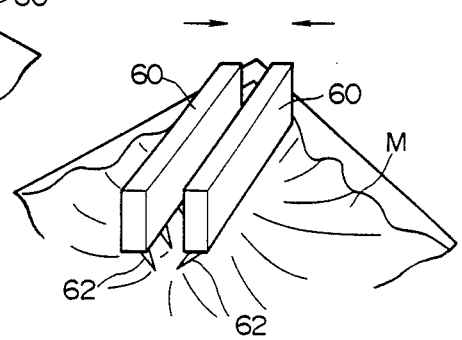
Figure 12:
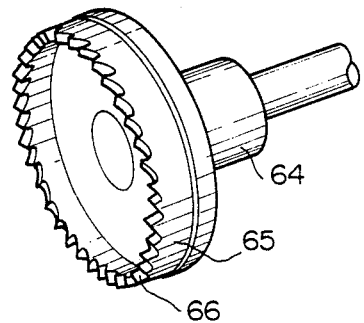
FIGS. 12 and 13 are perspective views of film peeling heads according to other embodiments, respectively, of the present invention.
Figure 13:
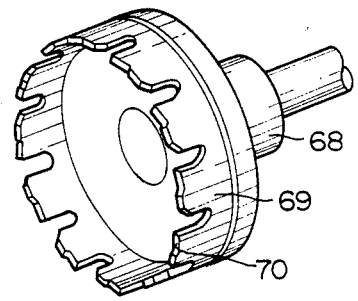

FIGS. 11 through 13 show peeling heads according to other embodiments of the present invention. A peeling head shown in FIGS. 11A and 11B comprises a pair of elongate plates 60 each having a plurality of needles 62 mounted on the lower surface thereof. The plates 60 are movable both vertically and horizontally as indicated by the arrows by a suitable actuator. When the plates 60 are moved horizontally toward each other (FIG. 11B), the needles 62 grip a wrinkled portion of the intermediate film M. A peeling head 64 shown in FIG. 12 has a ring 65 projecting from the lower surface thereof and extending along the periphery thereof, the ring 65 including sawteeth 66 on its lower peripheral edge. According to the embodiment shown in FIG. 13, a ring 69 projects from the lower surface and extends along the periphery of a peeling head 68, and includes a plurality of circumferentially spaced teeth 70. The peeling heads 64, 68 shown in FIGS. 12 and 13 are rotatable alternately clockwise and counterclockwise for wrinkling the intermediate film.

Figure 14:
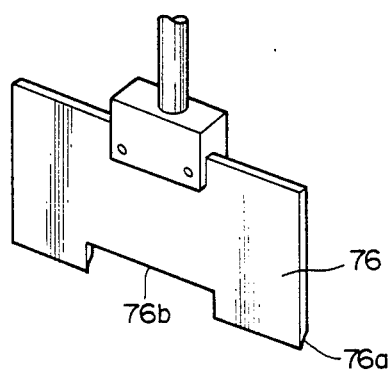
FIG. 14 is a perspective view of a film holder cutter.
Figure 15:
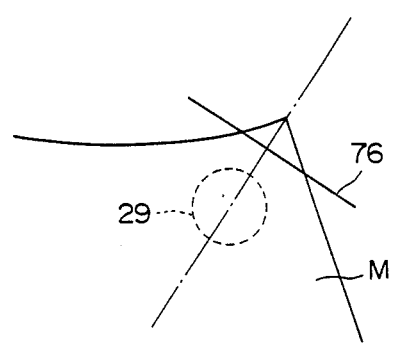
FIG. 15 is a schematic view illustrating how the film holder cutter shown in FIG. 14 operates.

The intermediate films M stacked on the pallet 4 stick together due to gravity. The peeling heads described thus far are designed to peel the intermediate films M one at a time. As the number of the intermediate films M in the stack is reduced, the films M tend to be taken as a whole from the pallet 4 before the uppermost one is peeled from the remainder. Such a problem can be solved by employing a film holder cutter 76 in the form of a thin plate shown in FIG. 14. The film holder cutter 76 is rectangular in shape and has a cutting edge 76a on its lower end and a recess 76b defined in a central portion of the lower end. A pair of such film holder cutters 76 is vertically movably attached to the supports 12, respectively. When the number of remaining intermediate films M on the pallet 4 reaches 10 as detected by a suitable sensor 78 (FIG. 1), each of the film holder cutters 76 is lowered toward one corner of the uppermost intermediate film M and cuts off the same while holding the film M, as shown in FIG. 15, after which the next intermediate film M is held down at its corner by the recess 76b of the film holder cutter 76. In this manner, the intermediate films M can be peeled reliably one at a time until the lowermost film M is removed.

Figure 16:
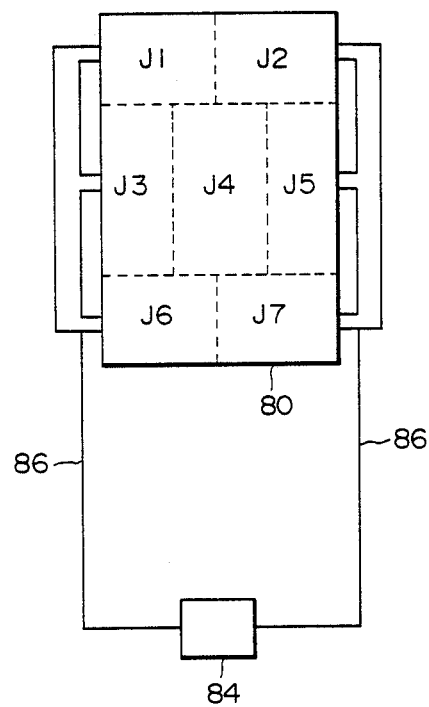
FIG. 16 is a schematic plan view of a table used in a positioning station.

As shown in FIG. 1, the positioning station S2 has a hollow table 80 having a slanted upper surface with the upstream end slightly higher than the downstream end. The table 80 has a number of small holes 82 defined vertically through its upper panel. The hollow table 80 has its inner space divided into seven subchambers J1, J2, J3, J4, J5, J6, J7 as shown in FIG. 16. The subchambers J1, J2, J3, J5, J6, J7, except the central subchamber J4, are connected to an air supply device 84 through hoses 86. As shown in FIG. 1, four positioning members 87 are disposed on upstream and lateral sides of the table 80 and two stoppers 88 are disposed on a downstream side of the table 80, the positioning members 87 being coupled to respective motors (not shown).

When the intermediate film M is fed onto the table 80, compressed air is supplied from the air supply device 84 into the subchambers J1, J2, J3, J5, J6, J7 through suitable filters (not shown) and ejected upwardly from the holes 80 to float the intermediate film M slightly above the upper surface of the table 80. Since the upper surface of the table 80 is slanted as described above, the intermediate film M floating above the table 80 is moved downstream until its downstream edge is engaged by the stoppers 88. When the film M is engaged by the stoppers 88, the motors coupled to the positioning members 87 are energized to move the positioning members 87 to position the intermediate film M in place on the upper surface of the table 80. Then, the subchambers J1, J2, J3, J5, J6, J7 are evacuated to attract the film M onto the upper surface of the table 80.

The positioning station S2 also has a feed device 90 which comprises &two supports 91 slidably engaging the respective fixed rails 2 and operatively coupled to a motor 92 through a timing belt 93, and feed rods 94 vertically movably mounted on the respective supports 91 and each having a plurality of suction pads 95. After the positioned intermediate film M has been attracted by the suction pads 95, the motor 92 is energized to move the supports 91 downwardly along the fixed rails 2 into a next cutting station S3. The subchamber J4 in the table 80 is not supplied with air because if compressed air were supplied to the subchamber J4 when positioning the intermediate film M on the table 80, the central portion of the film M would be raised above the subchamber J4, making it difficult to position the film M on the table 80.

Figure 17:
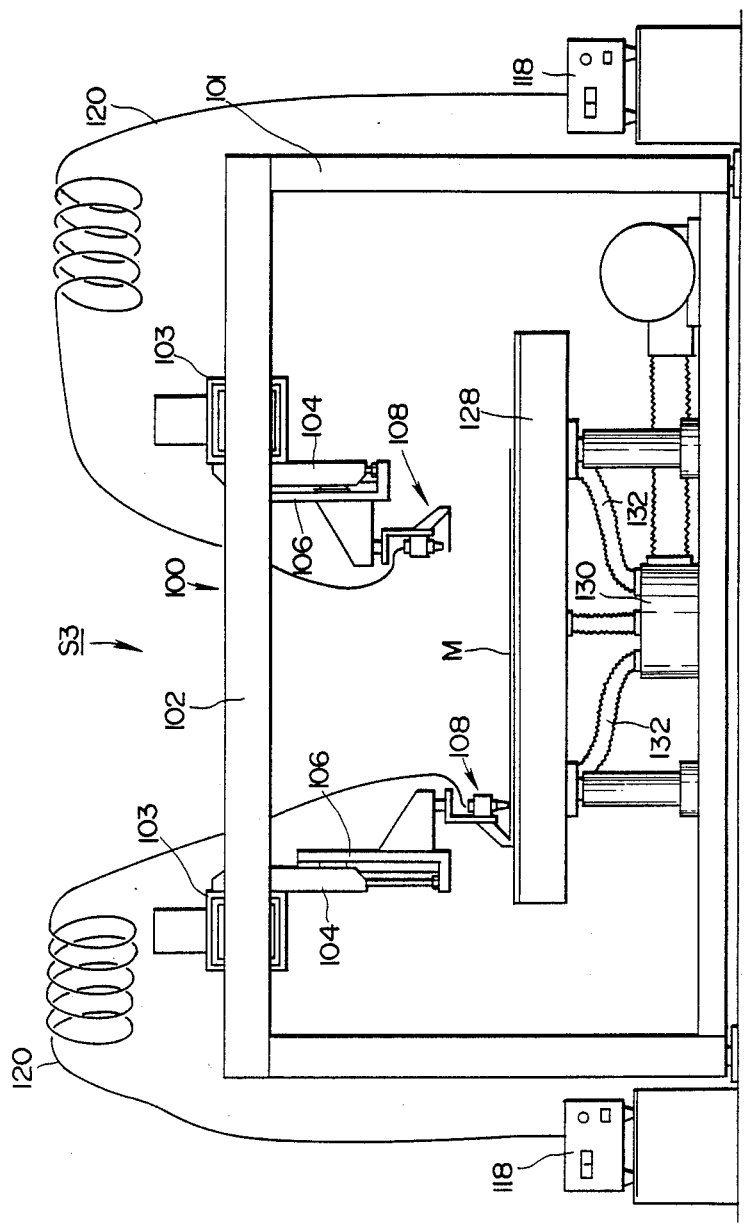
FIG. 17 is an elevational view of a cutting station.
Figure 18:
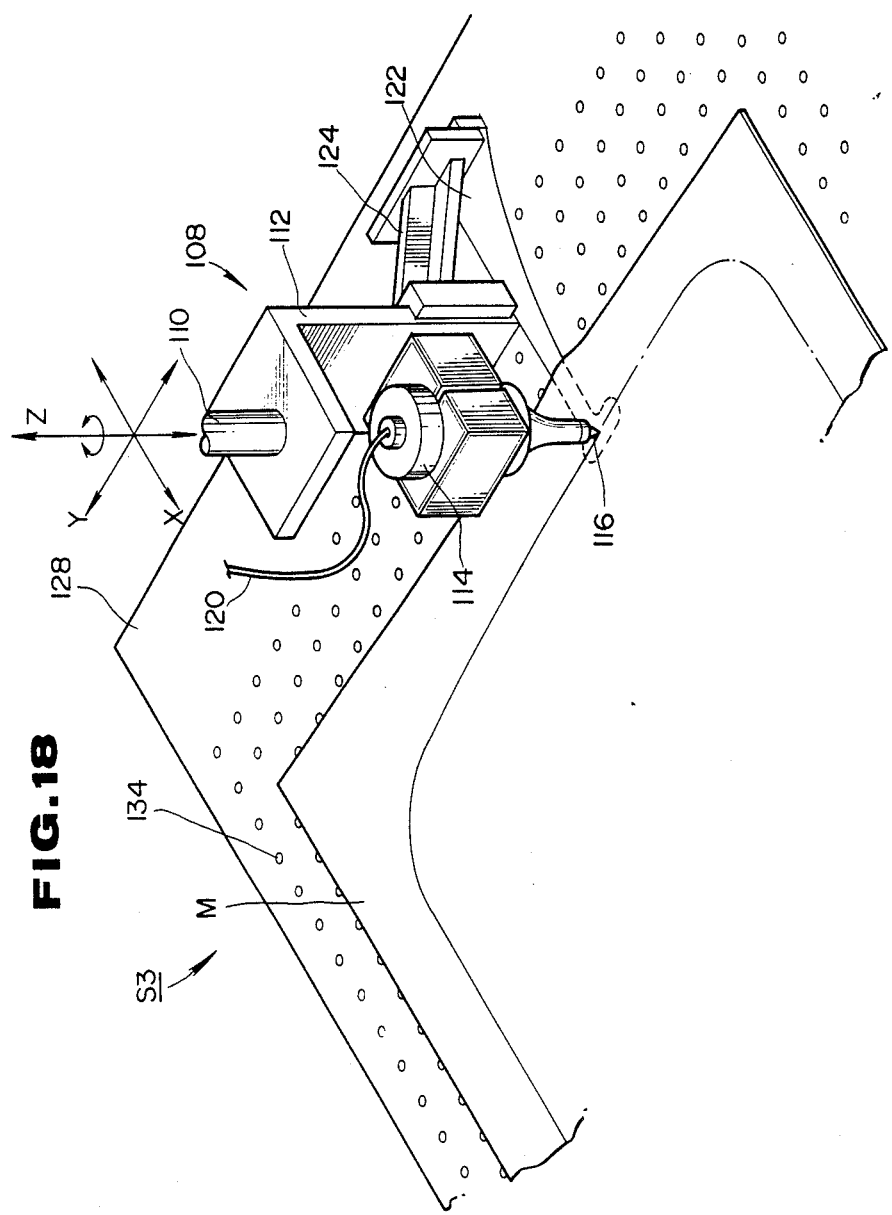
FIG. 18 is an enlarged perspective view of a cutting head assembly shown in FIG. 17.

As shown in FIG. 17, the cutting station S3 has a frame assembly 100 comprising a vertical frame 101 and a horizontal frame 102. Moving mechanisms 103 including ball screws (not shown) are supported on the horizontal frame 102, and a pair of supports 104 movable in two directions (i.e., along X and Y axes in FIG. 18) in a horizontal plane is attached respectively to the moving mechanisms 103. A vertically movable body 106 that is movable vertically (i.e., along a Z axis in FIG. 18) by a pneumatic cylinder (not shown). A cutting head assembly 108 which is rotatable about the Z axis in the horizontal plane is mounted on each of the vertically movable body 106. As shown in FIG. 18, each of the cutting head assemblies 108 comprises a rotatable shaft 110 rotatably supported on the vertically movable body 106, an inverted L-shaped bracket 112 fixed to the rotatable shaft 110, an ultrasonic transducer 114 fixed to the bracket 112, and a cutter blade 116 installed on the converter 114. The transducer 114 is electrically connected to an ultrasonic oscillator 118 through a high-frequency cable 120. A slender coacting arm 122 is joined to the bracket 112 through a joint member 124. As illustrated in FIGS. 19 and 20, the coacting arm 122 has a low horizontal surface and a vertical through hole 124 defined therein for receiving a portion of the cutter blade 116 therein. When the ultrasonic oscillator 118 is energized, the transducer 114 enables the cutter blade 116 to produce vertical ultrasonic vibration. A hollow suction table 128 for supporting the intermediate film M thereon is positioned in the frame assembly 100 and connected to a discharge blower 130 through duct mechanisms 132. The suction table 128 has a number of small holes 134 defined through its upper panel. When the discharge blower 130 is operated, the interior space of the table 128 is evacuated to attract the intermediate film M on the suction table 128 through the holes 134.

The intermediate film M that has been fed from the positioning station S2 to the cutting station S3 by the suction pads 95 of the feed device 90 is placed on the suction table 128. The discharge blower 130 is operated to discharge air out of the discharge table 128 to attract the intermediate film M under vacuum on the suction table 128. Then, the cutting head assemblies 108 are positioned above the suction table 128, as indicated by the righthand cutting head assembly 108 in FIG. 17. One of the cutting head assemblies 108 is now moved from a point A to a point F (FIG. 21), whereas the other cutting assembly 108 is moved from a point H to a point E. Thereafter, the cutting head assemblies 108 are lowered to a position as indicated by the lefthand cutting head assembly 108 in FIG. 17. The ultrasonic oscillator 118 is energized to vertically vibrate the cutting blades 116, while at the same time the coacting arms 122 are rotated 90° counterclockwise about the axis of the rotatable shaft 110 from the position indicated by the broken lines in FIG. 21. Since the tip end of each of the coacting arms 122 has a slanted side surface (see FIGS. 19 and 20), the coacting arm 122 can easily slip into the gap between the intermediate film M and the suction table 128. Though the above operation, the intermediate film M is cut by the cutter blades 116 along a line between points A, F and a line between points E, B in FIG. 21. Thereafter, the supports 104 are moved and the cutting head assemblies 108 are rotated under the control of a controller (not shown) to cut the intermediate film M along a broken line 140 and a solid line 142. The lines 140, 142 along which the film M is cut are drawn to a size which is about 1 to 2 mm larger than the size of glass sheets between which the intermediate film M is to be sandwiched. After the film M has been cut, a film scrap left on the suction table 128 is swept off the suction table 128 by sweepers 144 disposed near the feed device 90.

As shown in FIG. 1, the first conveyor line L1 and the second conveyor line L2 are interconnected by a transfer mechanism 150. The transfer mechanism 150 includes a horizontal frame 152 extending perpendicularly to the fixed rails 2 and supported on three support posts 154. As shown in FIG. 22, a guide rail 156 is laid on the upper surface of the horizontal frame 152 and extends longitudinally therealong. A pair of mobile units 160, 161 movably engages the guide rail 156. The mobile units 160, 161 are coupled to each other by a connector 162 which is fixed to a timing belt 164. When the timing belt 164 is driven by a motor (not shown), the mobile units 160, 161 are simultaneously moved along the guide rail 156b between the cutting station S3 and a film placing station S4. Slider plates 168, 169 which are vertically slidable by pneumatic cylinders (not shown) are mounted on sides of the mobile units 160. 161. To the slider plate 168, there is attached a first feed rod 170 extending parallel to the fixed rails 2 and positioned substantially centrally over the intermediate film M, and to the other slider plate 169, there is attached a second feed rod 171 extending near and parallel to one side of the intermediate film M. The feed rods 170, 171 support plural suction pads 172, 173, respectively, connected to a vacuum source (not shown). The intermediate film M attracted by the suction pads 172, 173 is transferred from the cutting station S3 to the film placing station S4.

The second conveyor line L2 has two parallel fixed frames 130 extending longitudinally along the line L2. Two glass sheets G1, G2 are first conveyed along the second conveyor line L2 into the film placing station S4 which is the most upstream station on the line L2. The lefthand one (located downstream) G1 of the paired glass sheets will be located on the inner side of an automobile on which the manufactured laminated glass will be installed as a windshield. The glass sheet G1 is delivered along the line L2 with the convex side up. The other glass sheet G2 (located on the righthand side or upstream) will be located on the outer side of the automobile, and is delivered along the line L2 with the concave side up.

As shown in detail in FIG. 22, the film placing station S4 includes two movable frames 182 disposed closely to and inwardly of the fixed frames 180, respectively, and reciprocally movable in the direction in which the glass sheets are conveyed along the line L2. To the movable frames 182, there are attached respective support rods 184 for supporting the two glass sheets G1, G2 thereon. A lifting/lowering device 186 is disposed between the fixed frames 180 and comprises a body 187 and a vertically movable member 188 which is vertically movable by a suitable pneumatic actuator (not shown). The vertically movable member 188 has four glass support elements 190 for supporting the two glass sheets G1, G2, each comprising a support base 192 disposed on the upper surface of the vertically movable member 188 and a ball 194 mounted in the support base 192. The support bases 192 are connected to a compressed-air supply (not shown). Therefore, when compressed air is supplied from the compressed-air supply to the support bases 192, the balls 194 are slightly elevated to allow the glass sheet G1 supported on the balls 194 to be easily moved.

Another horizontal frame 200 is supported on two support posts 202 downstream of and parallel to the horizontal frame 152. The horizontal frame 200 has a guide rail 204 on its upper surface. Two mobile units 206, 207 are slidably mounted on the guide rail 204. The mobile units 206, 207 are coupled to the upper and lower runs, respectively, of a timing belt 208. Therefore, when the timing belt 208 is driven by a suitable actuator, the mobile units 206, 207 are moved in opposite directions, i.e., toward or away from the other. Slender rods 210 are attached respectively to the mobile units 206, 207 and project therefrom in the direction opposite to the direction in which the glass sheets are conveyed, for stretching out any wrinkles which may be formed on the intermediate film M when placing the film M on the glass sheet. To the horizontal frame 200, there are also secured two inverted L-shaped brackets 212 extending upstream, with an attachment plate 214 fixed to the distal ends thereof. A pneumatic cylinder 216 is mounted on the attachment plate 214 and has a piston rod to which a vertically movable plate 220 is fixed. Rods 222 extend downwardly from the four corners of the vertically movable plate 220, and presser pads 224 are mounted respectively on the lower ends of the rods 222 for holding down the upper surface of the intermediate film M. Positioning devices 230 are disposed laterally of the fixed frames 180, respectively. Each of the positioning devices 230 comprises a support base 232 and a positioning member 236 supported on the support base 232 and movable back and forth in directions normal to the direction of delivery of the glass sheets by a pneumatic actuator 234.

Figure 23:
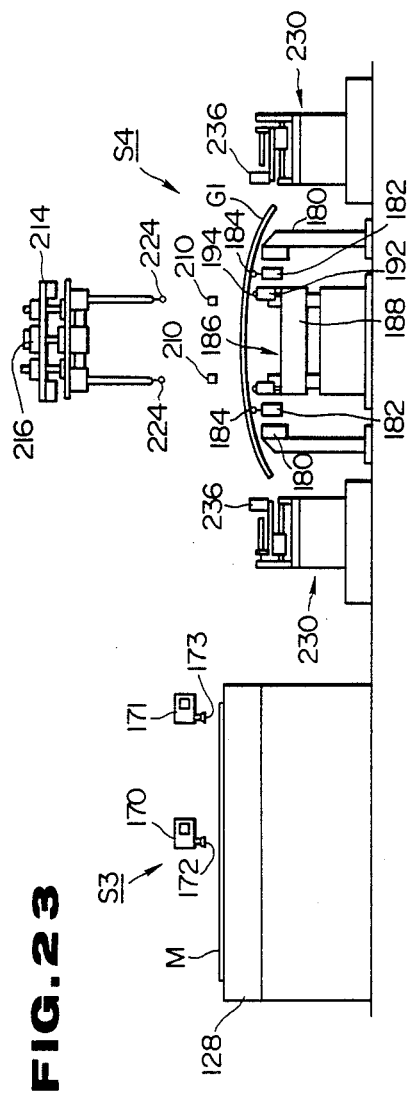
FIGS. 23 through 28 are elevational views showing a process of feeding an intermediate film from the cutting station to the film placing station with the feed mechanism.
Figure 24:
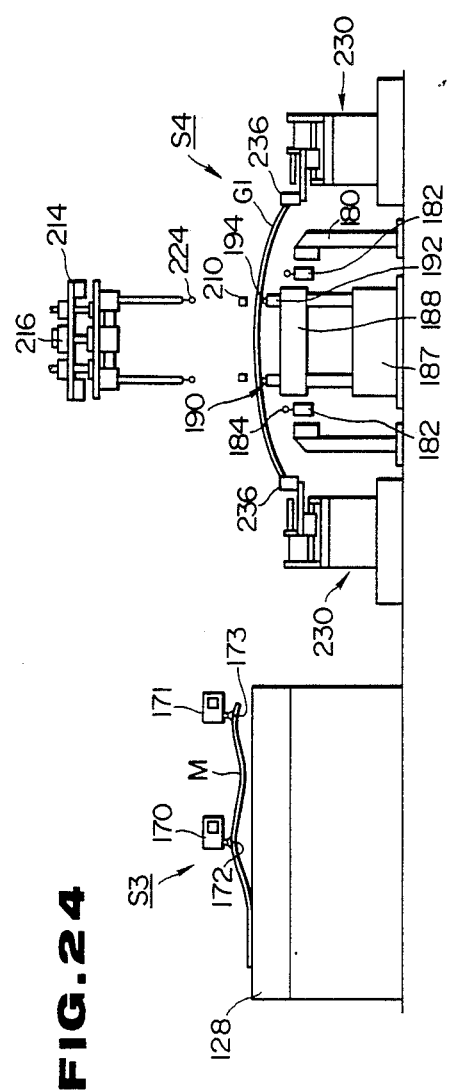

As shown in FIG. 23, the intermediate film M cut to size is attracted to the suction table 128 in the cutting station S3, and the glass sheet G1 supported on the support rods 184 on the movable frames 182 with the convex side up is placed on the lifting/lowering device 186 in the film placing station S4. Then, in the cutting station S3, as shown in FIG. 24, the feed rods 170, 171 are lowered, and the central portion and one side of the intermediate film M are attracted and lifted by the suction pads 172, 173 of the feed rods 170, 171 while at the same time the suction table 128 stops its attracting operation. In synchronism with the above process, the pneumatic actuator is operated to elevate the vertically movable member 188 from the body 187 to place the glass sheet G1 on the glass support elements 190. Thereafter, the support bases 192 of the glass support elements 190 are supplied with compressed air to float the balls 194, and the pneumatic actuators 234 are operated to move the positioning members 236 inwardly to position the glass sheet G1. Since the balls 194 are floated when positioning the glass sheet G1, the glass sheet G1 can be positioned under a small force. The glass G2 is also positioned by a similar positioning process.

Figure 25:
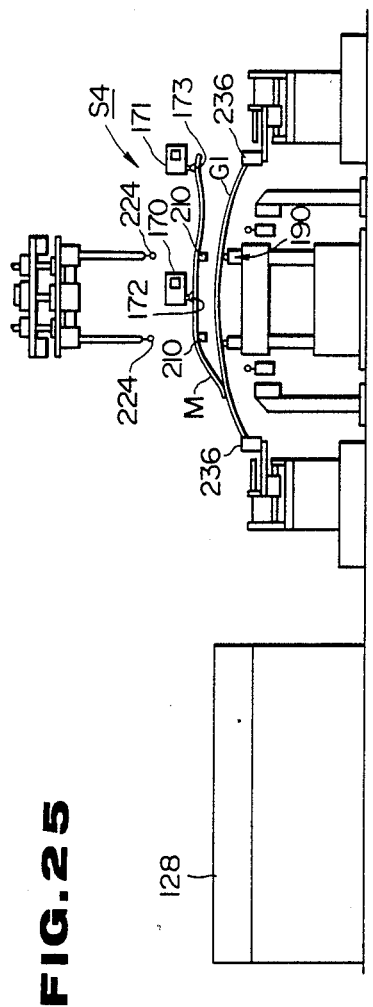
Figure 26:
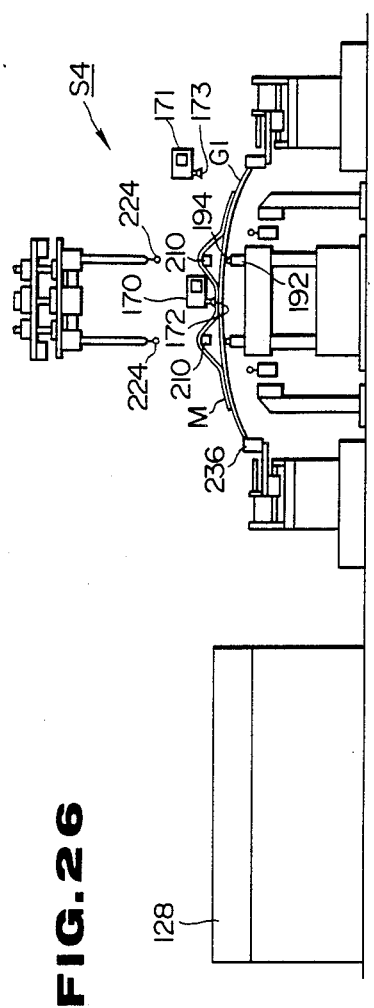

Then, the mobile units 160, 161 of the transfer mechanism 150 are moved along the guide rail 156 from the first conveyor line L1 to the second conveyor line L2 to carry the intermediate film M to a position above the rods 210, as shown in FIG. 25. As illustrated in FIG. 26, the suction pads 173 are disabled to release the side of the intermediate film M, and the other suction pads 172 are lowered to press the central portion of the film M down against the upper surface of the glass sheet G1.

Figure 27:
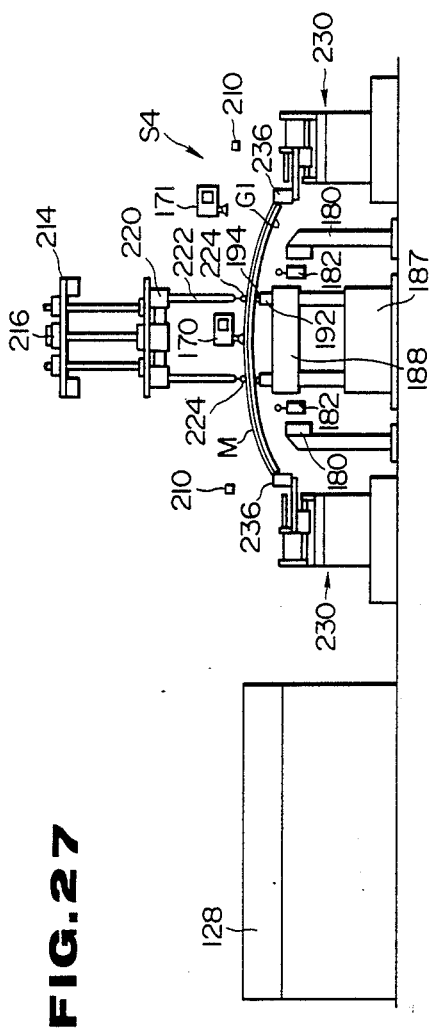
Figure 28:
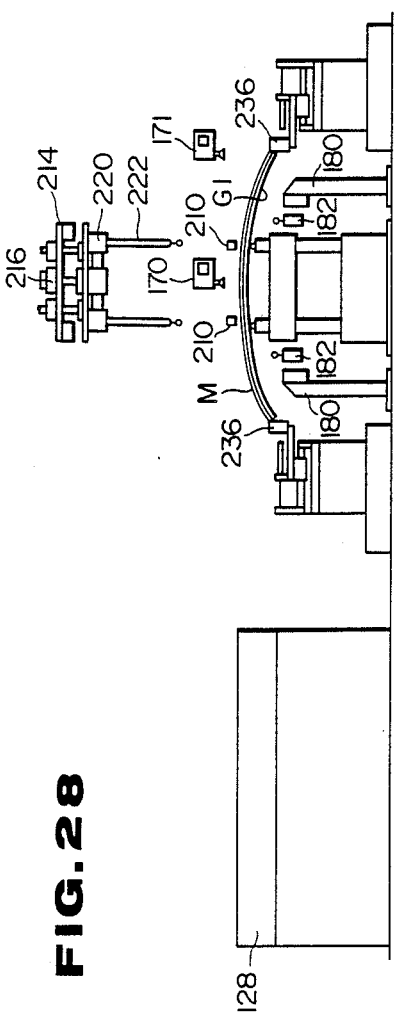

After the central portion of the film M has been pressed against the glass sheet G1, the rods 210 are moved outwardly away from each other as shown in FIG. 27 to place the intermediate film M on the glass sheet G1 while sufficiently stretching the film M. Then, the suction pads 172 are disabled and lifted, and the vertically movable plate 220 is lowered to cause the presser pads 224 to press the intermediate film M against the glass sheet G1.

Figure 29:
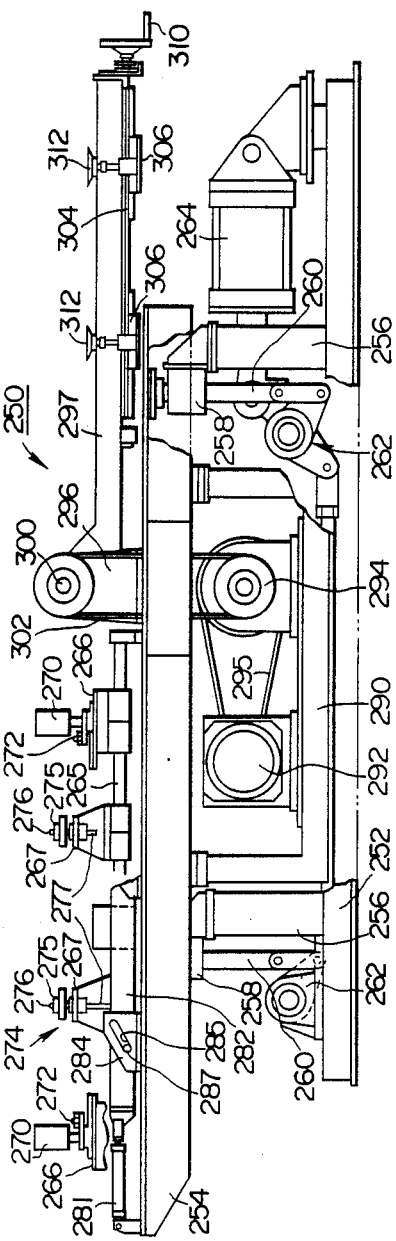
FIG. 29 is an enlarged elevational view of a superposing device in a superposing station shown in FIG. 1.
Figure 30:
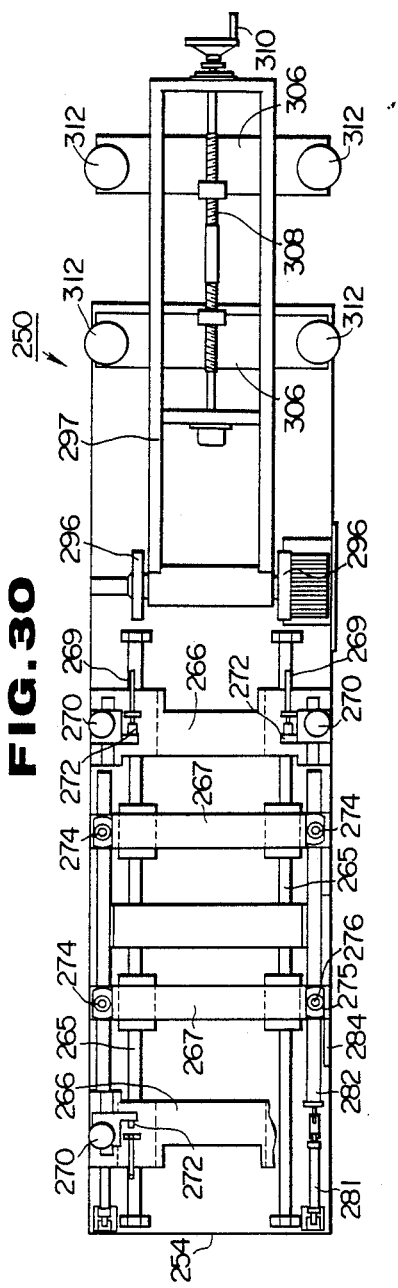
FIG. 30 is a plan view of the superposing device shown in FIG. 29.

A superposing station S5 which is positioned downstream of the film placing station S4 will now be described with reference to FIGS. 29 through 32. FIGS. 29 and 30 show a superposing device 250 in the superposing station which basically comprises a base frame 252 and a vertically movable frame 254. More specifically, a plurality of support posts 256 are vertically mounted on an upper surface of the base frame 252 which extends in the direction in which the glass sheets are conveyed. Suitable bearings 258 are mounted respectively on the upper ends of the support posts 256. The vertically movable frame 254 has vertical shafts 260 supported by the respective bearings 258 and having lower distal ends operatively coupled through link mechanisms 262 to the output shaft of a pneumatic cylinder 264 installed on the base frame 252.

Two parallel spaced support shafts 265 extending in the direction of travel of the glass sheets are mounted on the upper surface of the vertical movable frame 254. Four cross plates 266, 267 are movably supported on the support shafts 265. These cross plates 266, 267 threadedly engage respective ball screws (not shown) and can independently be moved along the support shafts 265 by handles (not shown) attached to ends of the ball screws. The two cross plates 266, which are positioned outwardly of the cross plates 267, have positioning members 270, respectively, movable by pneumatic cylinders 269, and air nozzles 272, respectively. When compressed air supplied from a compressed-air supply (not shown) is ejected from the air nozzles 272, the marginal edge of the intermediate film M which protrudes beyond the peripheral edge of the glass sheet G1 is raised upwardly from the upper surface of the glass sheet G1. Consequently, the intermediate film M is prevented from being pinched between the positioning members 270 and the glass sheet G1 when the glass sheet G1 is positioned.

The cross plates 267 which are positioned between the cross plates 266 support thereon glass support elements 274 which are identical in structure to the glass support elements 190. That is, each of the glass support elements 276 comprises a support base 275 and a ball 276 disposed in the support base 275. The balls 276 are floated from the support bases 275 by compressed air supplied from a compressed-air supply (not shown) connected to the support bases 275. When the balls 276 are floated from the support bases 275, the glass sheet G1 can easily be positioned as it can be moved with a small force. Rods 277 extend downwardly from the respective support bases 275, and cam followers (not shown) such as rollers are mounted on the respective lower ends of the rods 277. Pneumatic cylinders 281 are mounted on the upper surface of the vertically movable frame 254 and have respective piston rods connected to elongate vertically movable shafts 282 which are operatively coupled through pins 287 thereof to cam plates 284 mounted vertically on the upper surface of the vertically movable frame 254, the cam plates 284 having inclined sots 285 in which the pins 287 engage. The cam followers on the rods 277 are held in engagement with the vertically movable shafts 282. When the pneumatic cylinders 281 are operated, therefore, the pins 287 are moved upwardly along the inclined slots 285 and so are the vertically movable shafts 282, so that the rods 27 and hence the glass support elements 274 are elevated.

A support base 290 is disposed on the upper surface of the base frame 252 and supports thereon a motor 292 and a speed reducer 294 operatively coupled to the motor 292 through an endless belt 295. A frame 297 is rotatably supported on a pair of upstanding brackets 296 disposed on the vertically movable frame 254. When the motor 292 is energized, rotation of the output shaft of the motor 292 is transmitted via the endless belt 295 to the speed reducer 294, and after having been reduced in speed, is transmitted through another endless belt 302 to a rotatable shaft 300 which is rotatably supported on the brackets 296 by suitable bearings. As a result, the rotatable frame 297 is rotated about a shaft 300 on the brackets 296.

Guide rails 304 are attached to the lower surface of the rotatable frame 297, and two cross plates 306 are held in slidable engagement with the guide rails 304. The cross plates 306 threadedly engage a ball screw 308 having a handle 310 on one end thereof. By turning the handle 310, therefore, the cross plates 306 can be moved toward or away from each other. Each of the cross plates 306 has suction pads 312 on its opposite ends for supporting the glass sheet G2.

Figure 31:
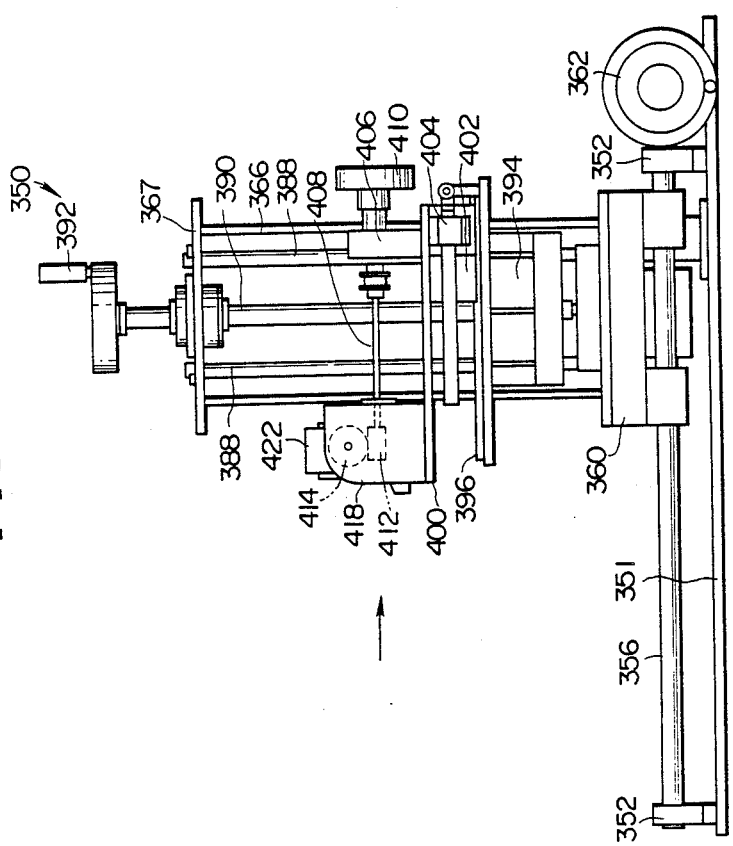
FIG. 31 is an enlarged elevational view of a positioning device in the superposing station shown in FIG. 1.
Figure 32:
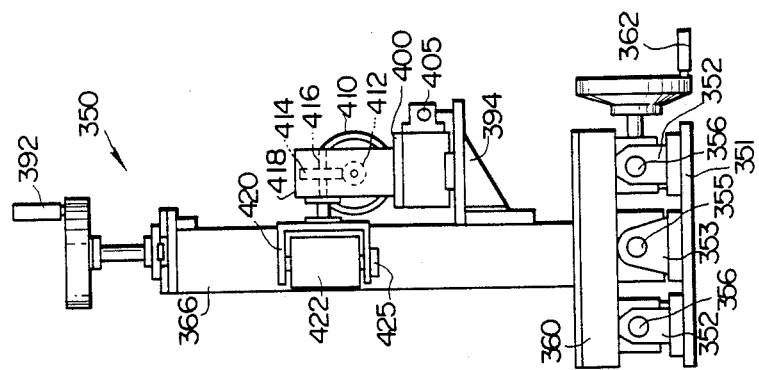
FIG. 32 is a view of the positioning device as viewed in the direction of the arrow in FIG. 31.

As shown in FIGS. 31 and 32, each of two positioning devices 350 in the superposing station S5 includes a rectangular base plate 351 with brackets 352, 353, 352 mounted on each of its opposite ends, a ball screw 355 extending between and supported by the central brackets 353, and two guide rods 356 extending between and supported by the laterally spaced brackets 352. The ball screw 355 threadedly extends through a movable base 360, and the guide rods 356 slidably extend through the movable base 360. By turning a handle 362 coupled to the ball screw 355, therefore, the movable base 360 is moved in a direction transverse to the direction of travel of the glass sheets, i.e., in a transverse direction of the positioning device 350, while being guided by the guide rods 356. On the movable base 364, there are disposed a vertical support frame 366, two guide rods 388 extending between the movable base 364, the support frame 366, and a horizontal plate 367 mounted on the upper end of the support frame 366, and a ball screw 390 extending between the movable base 360 and the horizontal plate 367. A vertically movable member 394 threadedly engaging the ball screw 390 can be vertically moved while being guided by the guide rods 388 by turning a handle 392 attached to the upper end of the ball screw 390.

An engaging plate 402 attached to the lower surface of an attachment plate 400 is held in slidable engagement with a guide rail 396 laid on the vertically movable member 394. The engaging plate 402 engages a piston rod 405 of a pneumatic cylinder 404. Thus, the attachment plate 400 can be moved transversely of the positioning device 350 by actuating the pneumatic cylinder 404. The attachment plate 400 supports thereon a bracket 406 in which a rotatable shaft 408 is rotatably supported by means of a suitable bearing 406 in the bracket 406. The rotatable shaft 408 has one end fixed to a handle 410 and the other end fixed to a worm 412 meshing with a worm gear 414 housed in a gearbox 418. The worm gear 414 is supported on a support shaft 416 having one end projecting out of the gearbox 418 and secured to a holder 420. A roller 422 for engaging one side of the glass sheet is rotatably supported by the holder 420. The angle of the roller 422 with respect to the vertical can be adjusted by turning the handle 410. An air nozzle 425 which is structurally identical to the air nozzle 272 is disposed near the roller 422.

Figure 33:
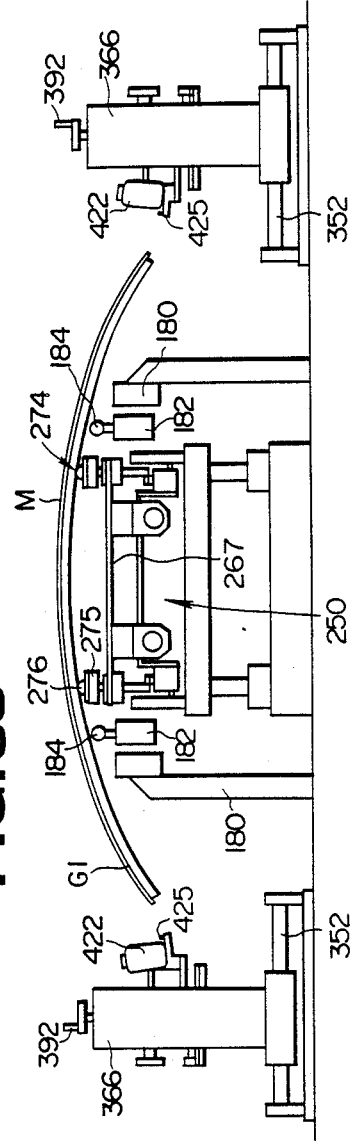

The vertically movable member 188 is lowered from the position of FIG. 24 to place the glass sheets G1, G2 on the support rods 184 again. The movable frames 182 are then moved downstream into the superposing station S5. At this time, the glass sheet G1 is fed to a position directly above the glass support elements 274, and the glass sheet G2 is fed to a position directly above the suction pads 312. The pneumatic cylinder 264 is operated to lift the vertically movable frame 254 until the glass sheet G1 is supported on the glass support elements 274 and the glass sheet G2 is supported on the suction pads 312, as shown in FIG. 33. Since compressed air is supplied to the glass support elements 274 at this time, the balls 276 are floated from the respective support bases 275 allowing the glass sheet G1 to be easily moved in a horizontal direction. The glass sheet G2 is not moved as it is attracted to the suction pads 312.

Figure 34:
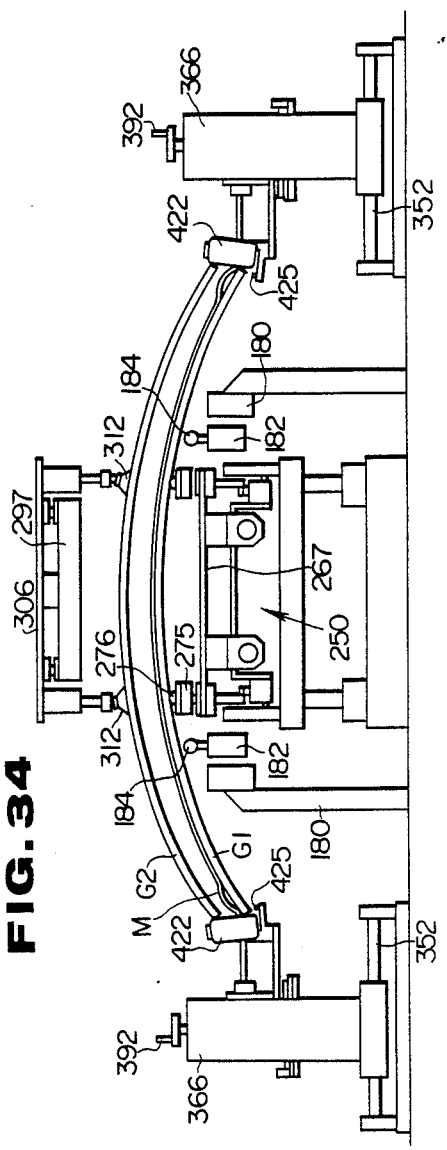

The motor 223 is energized to turn the frame 297 counterclockwise through 180° in FIG. 29 to position the glass sheet G2 above the glass sheet G1, as shown in FIG. 34. Then, the pneumatic cylinders 269 are operated to cause the positioning members 270 to position the glass sheets longitudinally with respect to the second conveyor line L2, and the rollers 422 are operated to position the glass sheets transversely with respect to the second conveyor line L2. At this time, compressed air is ejected from the air nozzles 425 to raise the ends of the intermediate film M protruding from the sides of the glass sheet G1, out of contact with the positioning members 270, the rollers 422, and the glass sheet G1, so that the glass sheets can accurately be positioned.

After the positioning of the glass sheets has been finished, the pneumatic cylinders 281 are operated to elevate the shafts 282 and the glass support elements 274 to shift the glass sheet G1 upwardly into superposing relation to the glass sheet G2, with the intermediate film M sandwiched therebetween, as shown in FIG. 35. Thereafter, the positioning members 270 and the rollers 422 are retracted to their original positions, after which the glass support elements 274 are lowered to place the superposed glass sheets G1, G2 on the support rods 184 on the movable frames 182, as shown in FIG. 36. Then, the movable frames 182 are moved downstream to deliver the glass sheets G1, G2 with the intermediate film M therebetween, into a next station (not shown).

Although there have been described what are at present considered to be the preferred embodiments of the present invention, it will be understood that the invention may be embodied n other specific forms without departing from the essential characteristics thereof. The present embodiments are therefore to be considered in all aspects as illustrative, and not restrictive. The scope of the invention is indicated by the appended claims rather than by the foregoing description.

We claim:

1. A method of manufacturing a laminated glass, comprising the steps of:
   automatically removing intermediate films, one at a time, from an intermediate film stack successively from an uppermost intermediate film position on the intermediate film stack;
   positioning the removed intermediate film;
   cutting the positioned intermediate film to a prescribed shape;
   positioning one of two curved glass sheets which has a convex side facing up;
   transferring said intermediate film over the convex side of said positioned one of the curved glass sheets;
   simultaneously positioning said one glass sheet over which said intermediate film has been transferred and the other glass sheet of said two glass sheets, and superposing said glass sheets one on the other with the intermediate film interposed therebetween;
   positioning said other glass sheet above said one glass sheet;
   lifting said one glass sheet toward said other glass sheet; and
   holding said one glass sheet against the lower surface of said other glass sheet with said intermediate film interposed therebetween, thereby superposing said glass sheets one on the other.

2. A method of manufacturing a laminated glass, comprising the steps of:
   automatically removing intermediate films, one at a time, from an intermediate film stack successively from an uppermost intermediate film position on the intermediate film stack;
   positioning the removed intermediate film;
   cutting the positioned intermediate film to a prescribed shape;
   positioning one of two curved glass sheets which has a convex side facing up;
   transferring said intermediate film over the convex side of said positioned one of the curved glass sheets;
   simultaneously positioning said one glass sheet over which said intermediate film has been transferred and the other glass sheet of said two glass sheets, and superposing said glass sheets one on the other with the intermediate film interposed therebetween;
   putting said intermediate film on two rods; and
   moving said two rods away from each other to stretch said intermediate film before said intermediate film is placed on the convex side of said one glass sheet.

3. A method according to claim 2, further comprising the step of:
   holding downwardly said intermediate film placed on the convex side of said intermediate film.

4. An apparatus for manufacturing a laminated glass, comprising:
   peeling means for automatically removing intermediate films, one at a time, from an intermediate film stack successively from an uppermost intermediate film position on the intermediate film stack;
   first positioning means for positioning the removed intermediate film;
   cutting means for cutting the positioned intermediate film to a prescribed shape;
   conveyor means for conveying two curved glass sheets;
   second positioning means for positioning the two curved glass sheets, respectively, which have been conveyed thereto;
   transfer means for transferring said intermediate film over a convex side of a positioned one of the curved glass sheets; and
   superposing means for simultaneously positioning said one glass sheet over which said intermediate film has been transferred and the other glass sheet of said two glass sheets, and for superposing said glass sheets one on the other with the intermediate film interposed therebetween, wherein said peeling means comprises:
   a film peeling unit for separating a portion of the uppermost intermediate film on the stack from the intermediate film positioned immediately thereunderneath;
   a film lifting unit for lifting the separated portion of the uppermost intermediate film; and
   a transfer unit for delivering the uppermost intermediate film from the stack while gripping the lifted portion thereof.

5. An apparatus according to claim 4, wherein said film peeling unit comprises a film peeling head which is movable vertically and rotatable, said film peeling head having a plurality of needles for penetrating the intermediate film.

6. An apparatus according to claim 4, wherein said film peeling unit comprises two film peeling heads which are movable vertically and rotatable, each of said film peeling heads having a plurality of needles for penetrating the intermediate film.

7. An apparatus according to claim 4, wherein said film peeling unit comprises a film peeling head which is movable vertically and rotatable, said film peeling head having ring-shaped sawteeth for penetrating the intermediate film.

8. An apparatus according to claim 4, wherein said film peeling unit comprises a film peeling head which is movable vertically and rotatable, said film peeling head having a plurality of circumferentially spaced teeth for penetrating the intermediate film.

9. An apparatus according to claim 4, wherein said film peeling unit further comprises a sensor for detecting the remaining number of intermediate films in the stack.

10. An apparatus according to claim 9, wherein said film peeling unit further comprises a film holder cutter having a cutting edge for cutting off a portion of the uppermost intermediate film on the stack and a recess for holding the intermediate film position beneath the uppermost intermediate film.

11. An apparatus for manufacturing a laminated glass, comprising:

peeling means for automatically removing intermediate films, one at a time, from an intermediate film stack successively from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have been conveyed thereto;

transfer means for transferring said intermediate film over a convex side of a positioned one of the curved glass sheets; and superposing means for simultaneously positioning said one glass sheet over which said intermediate film has been transferred and the other glass sheet of said two glass sheets, and for superposing said glass sheets one on the other with the intermediate film interposed therebetween, wherein said first positioning means comprises:

a table having a plurality of small holes defined therein for supporting the intermediate film on an upper surface thereof;

a plurality of stoppers mounted on said table; and a plurality of positioning members movably mounted on said table.

12. An apparatus according to claim 11, wherein said table has a plurality of subchambers defined therein, further including a compressed-air supply connected to the subchambers in said table except for the subchamber positioned centrally in the table.

13. An apparatus for manufacturing a laminated glass, comprising:

peeling means for automatically removing intermediate films, one at a time, from an intermediate film stack successively from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have bene conveyed thereto;

transfer means for transferring said intermediate film over a convex side of a positioned one of the curved glass sheets; and superposing means for simultaneously positioning said one glass sheet over which said intermediate film has been transferred and the other glass sheet of said two glass sheets, and for superposing said glass sheets one of the other with the intermediate film interposed therebetween, wherein said cutting means comprises:

a frame;

a cutting head assembly which is movable both vertically and horizontally and rotatably and mounted on said frame;

a suction table for supporting the intermediate film on an upper surface thereof; and said cutting head assembly comprising a cutter blade for cutting the intermediate film and a coacting arm to be inserted between said suction table and the intermediate film supported thereon, said coacting arm having a through hole defined in a distal and thereof for receiving a portion of said cutter blade.

14. An apparatus according to claim 13, further including an ultransonic oscillator connected to said cutter blade for ultrasonically vibrating the cutter blade vertically.

15. An apparatus according to claim 13, wherein said suction table has a number of small holes defined in an upper panel thereof, further including a discharge blower connected to said suction table.

16. An apparatus for manufacturing a laminated glass, comprising:

peeling means for automatically removing intermediate films, one at a time, from an intermediate film stack successively from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have been conveyed thereto;

transfer means for transferring said intermediate film over a convex side of a positioned one of the curved glass sheets; and superposing means for simultaneously positioning said one glass sheet over which said intermediate film has been transferred and the other glass sheet of said two glass sheets, and for superposing said glass sheets one on the other with the intermediate film interposed therebetween, wherein said second positioning means comprises:

a lifting/lowering device for supporting the curved glass sheets, said lifting/lowering device having plurality of glass support elements each comprising a support base and a ball disposed in said support base and flotable from the support base; and a pair of positioning devices disposed one on each side of and near said lifting/lowering device.

17. An apparatus for manufacturing a laminated glass, comprising:

peeling means for automatically removing intermediate films, one at a time, from an intermediate film stack successively from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have been conveyed thereto;

transfer means for transferring said intermediate film over a convex side of a positioned one of the curved glass sheets; and superposing means for simultaneously positioning said one glass sheet over which said intermediate film has been transferred and the other glass sheet of said two glass sheets, and for superposing said glass sheets one on the other with the intermediate film interposed therebetween, wherein said transfer means comprises:

a feed mechanism for feeding the intermediate film which has been cut over the convex side of said glass sheet, said feed mechanism including at least two feed rods each having a plurality of suction members for attracting the intermediate film under suction.

18. An apparatus for manufacturing a laminated glass, comprising:

peeling means for automatically removing intermediate films, one at a time, from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have been conveyed thereto;

transfer means for transferring said intermediate film over a convex side of a positioned one of the curved glass sheets; superposing means for simultaneously positioning said one glass sheet over which said intermediate film has been transferred and the other glass sheet of said two glass sheets, and for superposing said glass sheets one on the other with the intermediate film interposed therebetween; and stretching means for stretching out wrinkles which have been formed on the intermediate film when said intermediate film is placed over the convex side of said glass sheet, said stretching means comprising two slender rods mvoable in respective directions across the direction in which the glass sheets have been conveyed.

19. An apparatus according to claim 18, further including means for holding downwardly said intermediate film which has been placed on the convex side of the glass sheet.

20. An apparatus for manufacturing a laminated glass, comprising:

peeling means for automatically removing intermediate films, one at a time, from an uppermost intermediate film position on the intermediate film stack;

first positioning means for positioning the removed intermediate film;

cutting means for cutting the positioned intermediate film to a prescribed shape;

conveyor means for conveying two curved glass sheets;

second positioning means for positioning the two curved glass sheets, respectively, which have been conveyed thereto;

transfer means for transferring said intermediate film over a convex side of a positioned one of the curved glass sheets; and superposing means for simultaneously positioning said one glass sheet over which said intermediate film has been transferred and the other glass sheet of said two glass sheets, and for superposing said glass sheets one on the other with the intermediate film interposed therebetween, wherein said superposing means includes a superposing device, said superposing device comprising:

a base frame;

a vertically movable frame vertically movably mounted on said base frame and having a plurality of glass support elements for supporting the glass sheet with said intermediate sheet placed thereof; and a rotatable frame mounted on said vertically movable frame for angular movement in a vertical plane, said rotatable frame having a plurality of suction members for attracting the other glass sheet.

21. An apparatus according to claim 20, wherein said superposing means further includes a positioning device, said positioning device comprising:

a plurality of positioning members for positioning said glass sheets longitudinally with respect to the direction in which the glass sheets are conveyed; and a plurality of positioning members for positioning said glass sheets transversely with respect to said direction.

* * * * *